Patented Oct. 13, 1925.

1,557,348

UNITED STATES PATENT OFFICE.

JOHN C. SHOTTON, OF LAKEWOOD, OHIO.

SOLDERING COMPOUND.

No Drawing.   Application filed December 8, 1922.   Serial No. 605,704.

*To all whom it may concern:*

Be it known that I, JOHN C. SHOTTON, a citizen of the United States, residing at Lakewood, in the county of Cuyahoga and State of Ohio, have invented certain new and useful Improvements in Soldering Compound, of which the following is a specification.

The present invention relates to a soldering compound, the object of the invention being to provide a means whereby metal parts can be quickly soldered together without difficulty and a strong joint obtained.

While the invention can be used for the purpose of soldering many different kinds of metals, it is well adapted for use in soldering the precious metals, such as gold and platinum. The usual gold solder, such as is extensively utilized by dentists in their work is a mixture of gold and some baser metal such as zinc, which serves to lower the melting point, so that the solder will melt at a lower temperature than the parts to be connected or joined together. This usual form of gold solder, consisting of a mixture of gold and zinc, is furnished to the trade in the form of sheets or bars, and particles are cut or severed from the sheet or bar as they are required for use. There is a great deal of waste in using this form of gold solder, since the operator always cuts off larger pieces than are really needed. The presence of the zinc or baser metal in the solder also serves to contaminate the work and a seam is formed at the joint which is of low carat, and which is accordingly brittle and lacking in the ductility and strength which are characteristic of gold. This is a very great disadvantage in dental work since a joint is formed by a seam of brittle metal and leaves inherent weakness in the finished work.

In turning out a piece of work where several joints must be successively soldered, as when making a gold crown in dental work, its is necessary when using the solid gold solders in accordance with the present practice, to use a twenty carat solder on the first joint, an eighteen carat solder on the second joint and a lower carat of solder for each successive joint, so that the heat necessary for soldering the last joints will not be sufficiently high to destroy the earlier joints. This means that the successive joints become weaker, and in many kinds of work, such as dental work, this is very objectionable, and the work frequently breaks or gives way at the weak joint under a comparatively small strain.

According to the present invention all of the successive joints can be formed so that the joints consist of pure or twenty-four carat gold, and the joints will not be destroyed after being once formed by the fusing of the solder at a comparatively low temperature.

The improved metal solder may be in the form of a powder, paste or liquid, so that it can be very readily applied to the work and maintained in proper position thereon while being fused.

In carrying out the invention a decomposable product of the metal to be soldered is used, the product being of such a character that when subjected to heat it will fuse at a temperature much below the melting point of the metal to be soldered and be reduced or decomposed with the result that the metal is deposited at the joint and caused to produce a firm union between the parts to be connected. This decomposable product of the metal is preferably mixed with a suitable flux which serves in the usual manner to lower the melting point and remove the oxides from the metal parts to be soldered, leaving the metal surfaces in proper condition for union with the metal of the solder. A suitable vehicle may also be used for the purpose of holding the decomposition product of the metal and the flux and enabling them to be handled and held in proper position at the joint during the soldering process.

For making a gold solder the following ingredients can be used:

Gold chloride ($AuCl_3$ or $AuCl$ or a mixture of $AuCl_3$ and $AuCl$), borax ($Na_2B_4O_7 + 10H_2O$), glycerine ($C_3H_5(OH)_3$).

The gold chloride may be produced by any of the well known methods, as by boiling pure gold in aqua regia until it is completely dissolved and then evaporating the product to dryness until only a powder remains, or by treating metallic gold with chlorine gas. The gold chloride is ordinarily in the form of a yellowish powder and may either be the auric chloride ($AuCl_3$), the aurous chloride ($AuCl$) or a mixture of the auric and aurous chlorides. These chlorides are what may be termed decomposable products of the gold, and when the chlorides are sufficiently heated all of the chlorine is driven off and pure gold deposited, and this is done at a temperature very much below the melting point of gold.

The gold chlorides may and frequently do contain particles of finely comminuted gold in metallic form. It may also happen that chlorauric acid ($HAuCl_4$) is mixed with the auric and aurous chlorides, and this acid product of gold can be used in the same manner as the chlorides, since it is dissociated when subjected to heat and the gold residues deposited after the other constituents have been driven off.

The quantity of one-third by weight of borax is mixed with the gold chloride, or the above decomposable products, and the glycerine is next added until a paste or liquid is obtained, as may be desired. The paste or liquid may be put up in small bottles or containers for use, and the solder can be readily applied by a brush or the like to the parts to be soldered, so that there is practically no waste or loss in using a solder which is prepared in this manner. It is preferable to use bottles which are formed of colored glass or otherwise designed, so that light will be prevented from acting upon the compound to decompose the same, since it has been found that there is a tendency of some of the ingredients of the solder to disintegrate or dissociate if the product is permitted to remain in a bright light for a considerable length of time.

When two pieces of gold are to be soldered together, a small quantity of the solder compound is applied to the joint, and heat is then applied thereto in any suitable manner. The melting point of gold is approximately 1066° C. When the joint is heated to a temperature of about 180° C. the auric chloride, $AuCl_3$ is disintegrated into aurous chloride and chlorine according to the following formula:

$$AuCl_3 = AuCl + Cl_2.$$

As the heating is continued and a temperature of from 200 to 280° C. is reached the aurous chloride is completely dissociated into its respective constituents of chlorine and gold, the chlorine being driven off as a gas while the gold remains in metallic form. It is probable that the nascent chlorine which is liberated while the gold chlorides are being dissociated acts initially upon the surfaces of the parts to be soldered, perhaps forming a very thin film of chloride thereon which is subsequently reduced or dissociated when the higher temperature is reached. This would be of assistance in preparing the surfaces to be connected for intimate engagement with the metallic gold which finally remains after all of the chlorine has been driven off from the chlorides.

The borax is added as a flux and, so far as I am aware at the present time, merely has the usual fluxing and reducing action. When the borax is heated to a temperature of about 140° C. it becomes anhydrous, then melts, and when liquid readily dissolves any metallic oxides which may have formed upon the surfaces to be connected by the solder, and which would otherwise interfere with the proper action of the parts to be soldered. Any other equivalent or known fluxing agent may be substituted for the borax, and if the surfaces to be soldered are thoroughly cleansed a joint can be formed without the use of borax or any other flux, although better and more uniform results are obtained where a flux is used.

The glycerine acts mainly as a vehicle or carrying agent for the other ingredients. Any other suitable form of vehicle might be used, although it has been found by experiment that glycerine is very satisfactory for this purpose. When the solder is initially heated the glycerine immediately dries up and holds the soldering compound exactly where it is wanted. Objection to other substances which might otherwise be well adapted for use as a vehicle would be their tendency to melt and run upon the application of heat thereto, thereby causing a spreading and dissipation of the soldering compound so that instead of being concentrated at the joint it is spread out over a large surface. The glycerine dries up as soon as the heat is applied, with the result that the soldering compound is held exactly where it is wanted, instead of being permitted to become scattered and spread away from the joint. This not only facilitates the formation of good joints but is also conducive to economy in the use of the solder.

In preparing the gold solder, sodium gold chloride can be used, if desired, such as sodium chloraurate ($NaAuCl_4$) or chlorauric acid ($HAuCl_3 + 4H_2O$). In fact, almost any salt of gold may be used, or acid product such as chlorauric acid, the essential thing being that the solder include a decomposable product of gold, that is, a product which will be completely dissociated so as to leave metallic gold when subjected to a temperature considerably lower than that of the melting point of gold.

A platinum solder can be made in a similar manner by using a decomposable product of platinum, such as the platinic chloride ($PtCl_4$) or platinous chloride ($PtCl_2$). This platinic chloride might be used by itself, although it would preferably be mixed with a suitable flux, such as borax, and a vehicle, such as the glycerine, might be used to advantage in handling the mixture. The platinic chloride is dissociated at a temperature very much lower than the melting point of platinum and the process of soldering is substantially the same as that previously described in connection with the gold solder.

Where it is not necessary or desirable to use a pure platinum solder, the platinic chloride could be mixed with very small particles of metallic gold, or the platinum and gold chlorides might be mixed, so that the joint would be formed by a mixture of gold and platinum. The solders for other metals, such as the gold solder, might, if desired, be adulterated in an analogous manner, and provision may be made for coloring the gold solder, so that it can be used to advantage for soldering the differently colored gold products which are now quite extensively produced by jewelers and workers in the fine arts.

As has been previously mentioned, the use of this product enables a twenty-four carat solder to be used in soldering gold, and in dental work where a number of successive joints must be made upon the same piece of work, all of the joints can be made with this twenty-four carat solder, due to the fact that after a joint has once been formed it is substantially indestructible and will not be fused at a temperature below the melting point of gold, although the temperature required for making the joint is very much below that of the melting point of gold. This is a feature which is of very great value in dental work.

While the invention has been more specifically set forth and disclosed for use in soldering gold and platinum, it will be understood that there are other metals having salts or decomposable products which are dissociated or acted upon in a similar manner by heat, so that soldering compounds for these metals can be formed in a similar manner by mixing the said decomposable products with a suitable flux and perhaps also with a vehicle, and the same process can be used in soldering the joints. It will accordingly be understood that I do not restrict my invention to use in connection with gold and platinum, but that it can be used in connection with many other metals having salts or decomposable products with properties similar to those of the gold and platinum chlorides which have been specifically mentioned.

This application is a continuation in part of an application for gold solders and processes of making the same, which was filed by me on March 20, 1922, and which is identified by Serial No. 545,360.

Having thus described my invention what I claim as new and desire to secure by Letters Patent is,

1. A soldering compound including a decomposable product of a metal, said product being adapted to be fused and dissociated by heat to leave the metal residues at a temperature below the melting point of the metal.

2. A soldering compound including a flux and a decomposable product of a metal, said product being adapted to be fused and completely dissociated by heat to separate out the metallic residue thereof at a temperature below the melting point of the metal.

3. A soldering compound including the mixture of a vehicle and a decomposable product of a metal, the vehicle serving to hold the decomposable product in place at the joint to be soldered and the said product being adapted to be completely dissociated by heat and the metallic residue thereof separated out at a temperature below the melting point of the metal to be soldered.

4. A soldering compound including a mixture of a vehicle a flux and a decomposable product of a metal, said decomposable product being adapted to be dissociated by heat and the metal residue thereof separated out at a temperature below the melting point of the metal to be soldered.

5. A soldering compound including a salt of a metal, said salt being adapted to be fused and completely dissociated by heat to separate out the metal residue thereof at a temperature below the melting point of the metal.

6. A soldering compound including the mixture of a flux and a salt of a metal, said salt being adapted to be fused and completely dissociated by heat to separate out the metal residues thereof at a temperature below the melting point of the metal.

7. A soldering compound including a mixture of a decomposable product of a metal and metal particles, the product being adapted to be fused and completely dissociated by heat to separate out the metal residues thereof and cause them to fuse with the metal particles at a temperature below the melting point of the metal particles to be connected.

8. A gold solder including a gold salt adapted to be fused and completely dissociated by heat to separate out the gold at a temperature below the melting point of gold.

9. A gold solder including gold chloride.

10. A gold solder including gold chloride and a flux mixed therewith.

11. A gold solder including gold chloride and borax.

12. A gold solder including gold chloride, a flux and a vehicle.

13. A gold solder including gold chloride, borax and a vehicle.

14. A gold solder including gold chloride, borax and glycerine.

In testimony whereof I affix my signature.

JOHN C. SHOTTON.